United States Patent
Schritz

(10) Patent No.: US 6,494,647 B1
(45) Date of Patent: Dec. 17, 2002

(54) CURVED FILE APPARATUS

(76) Inventor: Ronald D. Schritz, 1038 E. Friar Dr., Apache Junction, AZ (US) 85219

( * ) Notice: Subject to any disclaimer, the term of this patent is extended or adjusted under 35 U.S.C. 154(b) by 0 days.

(21) Appl. No.: 09/329,382

(22) Filed: Jun. 10, 1999

(51) Int. Cl.$^7$ ............................................. B23D 71/00
(52) U.S. Cl. ............................. 407/29.14; 1409/29.1; 1409/29.15
(58) Field of Search ........................ 407/29.14, 29.15, 407/29.1, 29.12, 62, 64, 66; 76/12, 32; 33/628; 132/76.1, 76.2; 266/48

(56) References Cited

U.S. PATENT DOCUMENTS

| | | | | |
|---|---|---|---|---|
| 142,900 A | * | 9/1873 | Disston | 407/29.15 |
| 305,344 A | | 9/1884 | Simmons | |
| 352,083 A | * | 11/1886 | Custer | 407/29.1 |
| 430,094 A | * | 6/1890 | Spencer | 407/29.1 |
| 1,017,774 A | * | 2/1912 | Leavitt | 407/29.14 X |
| 1,273,184 A | * | 7/1918 | Ramson | 407/29.15 X |
| 1,418,974 A | * | 6/1922 | Rodow | 407/29.1 |
| 1,727,690 A | | 9/1929 | Anheuser | |
| 1,956,882 A | * | 5/1934 | Stowell | 407/29.11 |
| 2,058,912 A | | 10/1936 | Reid | |
| 2,214,954 A | * | 9/1940 | Crater | 407/29.1 |
| 2,445,753 A | * | 7/1948 | Anheuser | 407/29.14 |
| 2,687,562 A | | 8/1954 | Noll | |
| 2,833,025 A | * | 5/1958 | Crawford | 407/29.15 |
| 3,531,841 A | | 10/1970 | McCord, Jr. | |
| 3,733,663 A | | 5/1973 | Brucker | |
| 3,990,134 A | * | 11/1976 | Stoutenber | 407/29.1 |
| 4,178,663 A | | 12/1979 | Hayes | |
| 4,584,745 A | * | 4/1986 | Seiber | 407/29.1 X |
| 5,097,578 A | * | 3/1992 | Jandi | 407/29.1 |
| D355,829 S | | 2/1995 | Kotlarz | |

* cited by examiner

Primary Examiner—Henry Tsai
(74) Attorney, Agent, or Firm—H. Gordon Shields

(57) ABSTRACT

Curved file apparatus includes a base element having a straight file on a top surface and a curved element secured to the base element. The curved element includes a convex bottom file surface and a pair of flat file surfaces on the sides of the curved element. The curved element may stand aloe in a second embodiment, with its convex file surface and its flat file surfaces. Handle elements are secured to both embodiments.

9 Claims, 1 Drawing Sheet

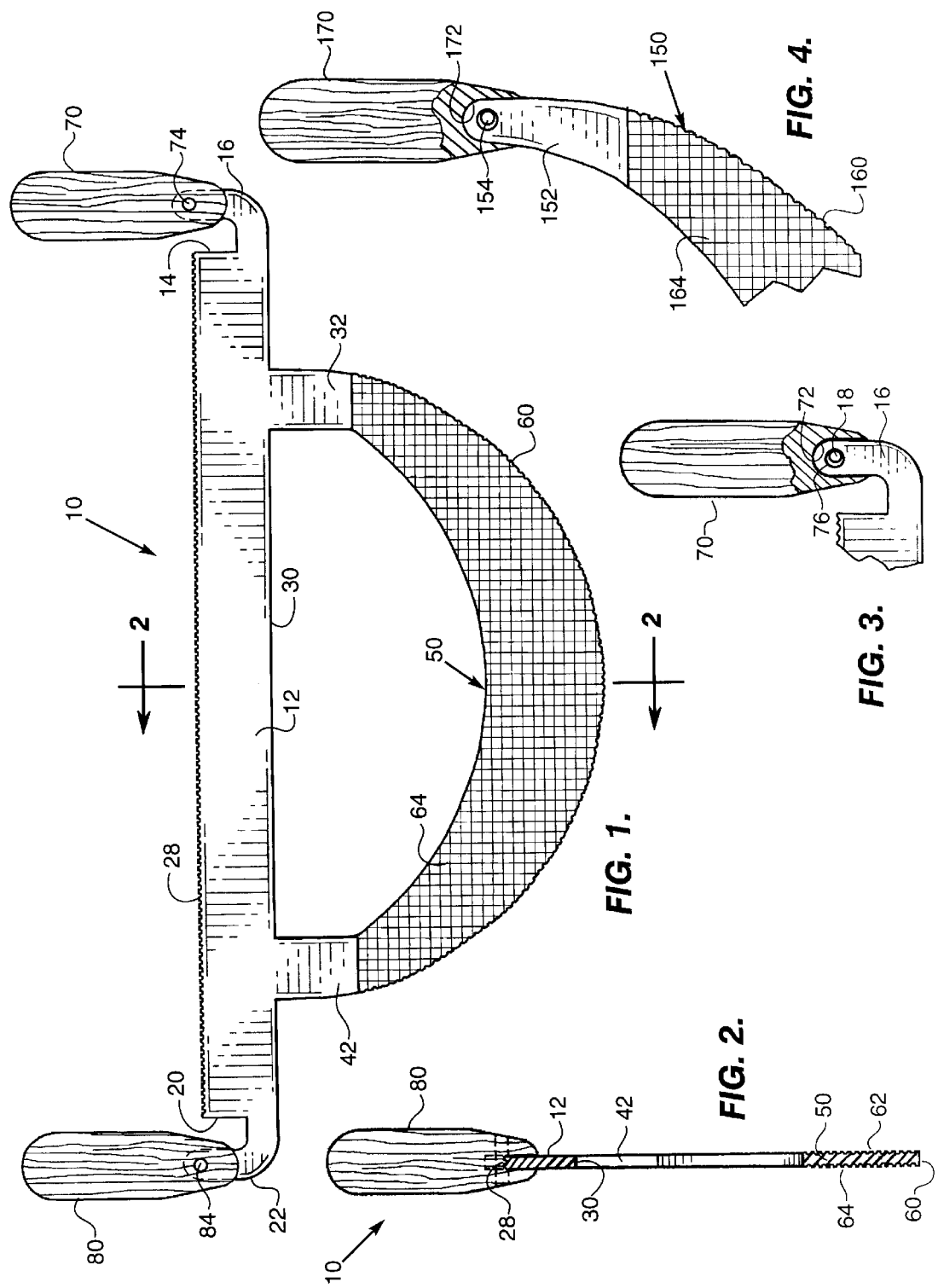

CURVED FILE APPARATUS

BACKGROUND OF THE INVENTION

1. Field of the Invention

This invention relates to files and; more particularly, to a file having a straight portion and a curved portion, and the curved portion includes three file surfaces.

2. Description of the Prior Art

U.S. Pat. No. 305,344 (Simons) discloses a file having a curved portion. There are two embodiments of the curved portion of the file, one of which includes a concave filing portion and the other embodiment which includes a convex filing portion.

U.S. Pat. No. 1,727,690 (Anheuser) discloses another file having a curved surface. The curved surface is convex.

U.S. Pat. No. 2,058,912 (Reid) discloses a file or abrasive tool formed of several flat elements appropriately secured together and, which, when finished, may be curved.

U.S. Pat. No. 2,687,562 (Noll) discloses a file having a transversely curved configuration.

U.S. Pat. No. 3,531,841 (McCord, Jr.) discloses a file holder in which a file is made of a ribbon type material and which may be curved. That is, the file portion, secured to a support frame, may be either flat or curved, as desired.

U.S. Pat. No. 3,733,663 (Brucker) discloses a rotary tool having a rasp or file surface. The surface is circular and may be appropriately curved, as desired. That is, different embodiments of the file or rasp surface may be secured to the tool to provide the desired ultimate configuration of the material on which the tool is used.

U.S. Pat. No. 3,990,134 (Stoutenberg) discloses a sheet metal file having a convex work surface.

U.S. Pat. No. 4,178,663 (Hayes) discloses a hand scraper which includes a convex work surface.

U.S. Pat. No. Des. 355,829 (Kotlarz) discloses a particular design for a corner shaping file. The file includes two abrading surfaces, and the abrading surfaces are disposed perpendicularly to each other. The apparatus of the present invention differs from the prior art in several aspects, one of which is that a plurality of abrading surfaces are found in the apparatus of the present invention and the apparatus of the present invention includes a curved surface which allows the desired abrading surface to be used very close to a corner, to a wall, etc.

SUMMARY OF THE INVENTION

The invention described and claimed herein comprises a file apparatus which includes a base element having a pair of handles secured to the base surface and a flat file surface on the base element. Extending downwardly from the base element there is a curved file which includes file surface on three sides, including a curved bottom and the sides. The sides of the curved element are flat.

Among the objects of the present invention are the following:

To provide new and useful file apparatus;

To provide new and useful file apparatus having a plurality of abrading surfaces;

To provide new and useful file apparatus including a curved file surface and generally flat file surfaces;

To provide new and useful file apparatus having file surfaces disposed generally perpendicular to each other; and To provide new and useful file apparatus including a convexly curved file surface and flat file surfaces adjacent to the curved file surface.

BRIEF DESCRIPTION OF THE DRAWING

FIG. 1 is a side view, a portion of which is broken away and in partial section of the apparatus of the present invention.

FIG. 2 is a view in partial section taken generally along line 2—2 of FIG. 1.

FIG. 3 is an enlarged view, in partial section of a portion of the apparatus of FIG. 1.

FIG. 4 is an enlarged view, partially broken away, of a portion of an alternate embodiment of the apparatus of the present invention.

DESCRIPTION OF THE PREFERRED EMBODIMENT

FIG. 1 is a side view of file apparatus 10 of the present invention. FIG. 2 is a view in partial section of the file apparatus 10 taken generally along line 2—2 of FIG. 1. For the following discussion, reference will primarily be made to both FIGS. 1 and 2.

File apparatus 10 includes a base element 12 which is generally of a rectangular configuration. The base element 12 includes a pair of ends 14 and 20 which are generally parallel to each other. The base element also includes a bottom 30.

Extending outwardly and upwardly from the ends 14 and 20 of the base element 12 are handle tangs 16 and 22, respectively. As best shown in FIG. 2, the base element is relatively narrow, and as best shown in FIG. 1, the base element 12 is rather elongated with respect to its width. Handles 70 and 80 are secured respectively to the tangs 16 and 22.

The handle tangs extend outwardly and upwardly from the base element 12. Handles 70 and 80 are appropriately secured to the respective tangs. This will be discussed in more detail, below. On the top of the base element 12 is a generally straight and flat filing or abrading surface 28.

Extending downwardly from the bottom 30 of the base element 12 are a pair of posts 32 and 42. A curved file element 50 extends between and is appropriately secured to the posts 32 and 42. The curved file element 50 includes a convex bottom filing or abrading surface 60 . id a pair of side filing or abrading surfaces 62 and 64. The side abrasive surfaces 62 and 64 are generally flat. The convex filing or abrading surface 60 extends between the posts 32 and 42.

As also best shown in FIG. 2, the curved file element 50 is relatively narrow, and is generally aligned with the base element 12. The abrading surfaces 28 and 60 are accordingly relatively narrow, while the side abrading surfaces 62 and 64 are dimensionally greater than the flat abrading surface 28 and the convex abrading surface 60. In other words, the width of the abrading surfaces 28 and 60 is relatively thin as compared to the length or width of the abrading or file surfaces 62 and 64.

The file apparatus 10 is a particular use for cabinet installers in which surfaces needing filing (abrading) may be adjacent to walls and which include inside corners. The file apparatus of the prior art are now amenable to uses on inside corners and adjacent to walls without the danger, often realized, of damaging adjacent walls or adjacent cabinetry, etc. However, the use of the curved file surface 60, as well as the flat or straight file surface 28, along with the flat file surfaces 62 and 64, allows the file apparatus 10 to be used in relatively confining areas and without the danger to adjacent finished surfaces, such as walls.

FIG. 3 is a fragmentary view of a portion of the tang 16 with a portion of the handle 70 secured thereto and a portion broken away to illustrate the securing of the handle 70 to the tang 16. For the following discussion, reference will be made to both FIGS. 1 and 3.

The tang 16 includes an aperture 18, and the handle 70 includes a slot 72 which receives a portion of the tang 16. The handle 70 also includes a pair of aligned apertures 74, shown in FIG. 1, which are aligned with the aperture 18 and the tang 16. When the upper portion of the tang 16 is inserted into the slot 72, the apertures 18 and 74 are aligned and a pin 76 is then inserted to secure the handle 70 to the tang 16.

The handle 80 is substantially identical to the handle 70, and the tang 22 is substantially identical to the tang 16. Thus, the tang 22 includes an aperture, and the handle 80 includes a pair of apertures 84, shown in FIG. 1, and the handle 80 also includes a slot which receives the upper portion of the tang 22. The aligned apertures in the tang and handle then receive a pin to secure the handle 80 to the tang 22.

The curved file portion 50 may be configured as a separate file 150, as illustrated in FIG. 4. FIG. 4 comprises a fragmentary view of a portion of a curved file apparatus 150. For the following discussion, reference will be made to both FIGS. 1 and 4.

The curved file 150 includes the essential features of the curved file portion 50 of the file apparatus 10. The curved file apparatus 150 includes a pair of tangs, of which a tang is shown and to which may be secured a pair of handles, of which a handle 170 is shown in FIG. 4. The tang elements of the apparatus 150 are essentially like the tang elements 16 and 22 which are secured to the base 12 of the file apparatus 10. The configuration of the tangs allows handles, such as handles 70 and 80, to be secured to the tang elements. Thus, the handle 170 is substantially identical to the handle 70.

The handle 170 includes a slot 172 and a pair of aligned apertures which, when the tang 152 is disposed in the slot 172, the aligned apertures in the handle 170 are aligned with the aperture 154 in the tang 152 and a securing pin may then be inserted into the aligned apertures to secure the handle 170 to the tang 152 of the curved file 150. The opposite tang receives a similar handle, substantially as discussed above with respect to the handle 170 and also substantially as discussed above for the handle 80 with respect to the tang 22.

The file 150 includes a convexly curved filing or abrading surface 160 and a pair of side filing or abrading surfaces, of which an abrading surface 164 is shown in FIG. 4. The file apparatus 150 is, like the file apparatus 10, and specifically like the curved file portion 50 thereof, relatively narrow and the side abrading surfaces, of which the surface 164 is shown, are generally flat.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. File apparatus comprising in combination:
    a generally rectangular base having a top and a pair of ends;
    a first file on the top of the base;
    curved file means for use in relatively confining areas extending downwardly from the base, including
        a convexly curved second file having a generally wide U-shaped configuration,
        a generally flat third file adjacent to the convexly curved second file,
        a generally flat fourth file adjacent to the convexly curved second file and generally parallel to the generally flat third file, and
        a pair of posts secured to the base and extending downwardly therefrom, and the convexly curved and U-shaped second file is secured to the posts.

2. The apparatus of claim 1 which further includes a pair of handles secured to the pair of ends.

3. The apparatus of claim 2 which further includes a pair of tangs extending outwardly and upwardly from the pair of ends, and the pair of handles is secured to the pair of tangs.

4. The apparatus of claim 1 which the base and the curved file means are relatively narrow.

5. File apparatus comprising in combination: a relatively narrow curved file for use in confined areas having a U-shaped pair of sides, each of which sides including a generally flat file surface with a width; and a relatively narrow convex file surface on the U-shaped bottom, wherein said convex file surface is thin relative to said width.

6. The apparatus of claim 5 which further includes a relatively narrow base element having a pair of ends and a pair of posts extending downwardly from the base element and connecting the base element to the U-shaped curved file.

7. The apparatus of claim 6 which further includes a pair of handles secured to the base element and extending upwardly and outwardly from the pair of ends of the base element.

8. The apparatus of claim 6 which the base element includes a top and a bottom, and the posts extend from the bottom.

9. The apparatus of claim 8 which the base element includes a file surface on the top.

* * * * *